United States Patent [19]

Adams

[11] Patent Number: 4,588,161

[45] Date of Patent: May 13, 1986

[54] ROTARY VALVE AND A METHOD OF FORMING A SLEEVE FOR SUCH A VALVE

[75] Inventor: Frederick J. Adams, Clevedon, England

[73] Assignee: TRW Cam Gears Limited, Hertfordshire, Great Britain

[21] Appl. No.: 629,214

[22] Filed: Jul. 9, 1984

[30] Foreign Application Priority Data

Aug. 5, 1983 [GB] United Kingdom ............... 8321219

[51] Int. Cl.$^4$ .......................... F16K 31/12; F16K 5/00
[52] U.S. Cl. .................................. 251/31; 251/309; 137/625.24; 29/157.1 A
[58] Field of Search ................................ 251/31, 309; 137/596.15, 625.63, 625.43; 91/375 A; 29/157.1 A, 156.7 R, 156.7 A, 156.7 B, 156.7 C, 156.63, 157.1 R, 402.05, 402.06, 432.2, 483

[56] References Cited

U.S. PATENT DOCUMENTS

| | | | |
|---|---|---|---|
| 3,921,669 | 11/1975 | Goff | 137/625.24 |
| 4,109,679 | 8/1978 | Johnson | 137/596 X |
| 4,194,531 | 3/1980 | Bishop | 137/625.24 X |
| 4,272,056 | 6/1981 | Komamura et al. | 251/309 |
| 4,454,801 | 6/1984 | Spann | 137/625.24 |

Primary Examiner—Larry Jones
Attorney, Agent, or Firm—Yount & Tarolli

[57] ABSTRACT

A rotary valve and a method of forming a sleeve for such a valve. The valve for controlling fluid pressure to a power assisted steering gear has a rotor 3 mounted in the bore 2 of a sleeve 1 so that relative rotation between the rotor and sleeve controls fluid flow through ports 5, 6a, 6b and 7 to actuate the power assistance means. The port 7 is in the form of an axially extending slot in the bore 2, one end 18 of the slot 7 terminating within the bore and the other end opening into an end face 19 of the sleeve to alleviate the requirement for an annular recess (such as 8, 9 or 10) on the sleeve for supply of fluid to the slot 7 and thereby permitting a reduction in length of the sleeve. The slot 7 may be flat bottomed and inclined relative to the sleeve axis and the method comprises rectilinearly machining such a slot—preferably as a single pass with a broaching tool inclined relative to the sleeve axis. In a modification two diametrically opposed slots 7 are provided which open into opposite end faces 19, 27 of the sleeve and have parallel and inclined flat bottoms, and the method comprises forming both said slots simultaneously or consecutively by rectilinear broaching as a single machining operation with the broaching tool inclined relative to the sleeve axis.

33 Claims, 14 Drawing Figures

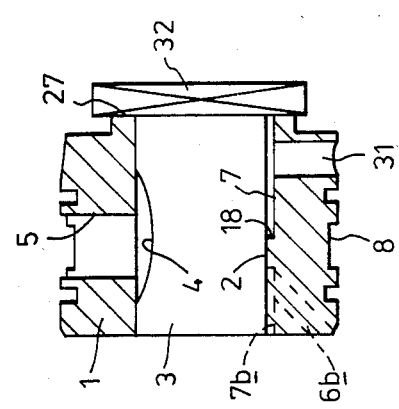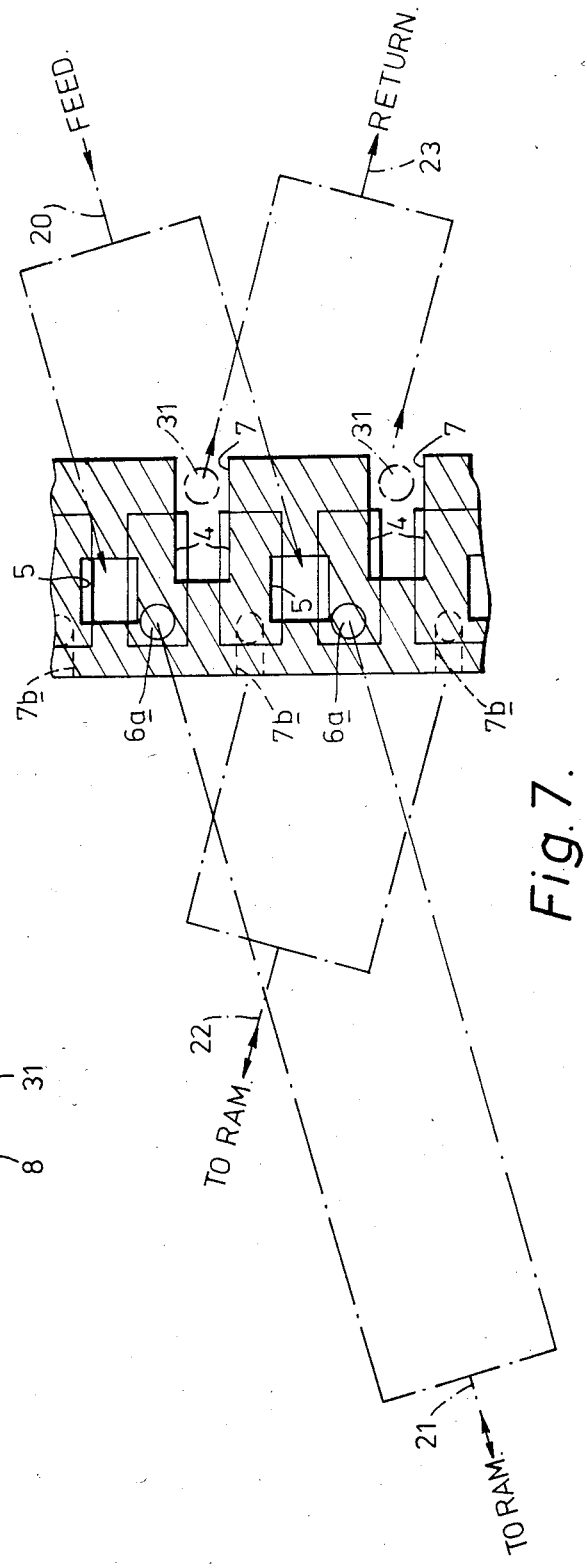
Fig. 6.
Fig. 7.

ROTARY VALVE AND A METHOD OF FORMING A SLEEVE FOR SUCH A VALVE

TECHNICAL FIELD AND BACKGROUND ART

This invention relates to a rotary valve and to a method of forming a sleeve for such a valve and is primarily concerned with rotary valves of the type utilised for controlling fluid (usually hydraulic) to power assistance means of a steering gear. Rotary valves for power assisted steering gears are well known in the automotive industry and conventionally comprise a rotor mounted in the bore of a sleeve so that during a steering manoeuvre the rotor and sleeve are rotationally displaced relative to each other and in so doing adjust control ports in the valve to direct fluid to and from power assistance means as appropriate to assist the steering manoeuvre. The power assistance means will usually be in the form of a double acting piston and cylinder device incorporated in the steering gear. Examples of rotary valves of the type aforementioned are to be found in U.K. Patent Specifications Nos. 391,775, 476,590 and 1,356,172, U.S. Pat. Nos. 1,947,973, 2,328,312, 1,657,412 and 1,773,794. In each of these examples fluid flow through the valve is achieved by providing distributing zones on the rotor which are displaced during the aforementioned relative rotation to determine fluid flow between ports in the valves, such ports being connected to fluid pressure supply, the power assistance means and exhaust/reservoir (low pressure return). Since the early 1930s the most favoured sleeve structure has comprised a peripherally spaced array of axially extending, blind ended, recesses in the bore of the sleeve. Whilst this popular design is efficient and reliable in operation, it suffers from two serious disadvantages. Firstly, the design does not lend itself to economic manufacture on a mass production basis where either several assembly stages are required for producing the sleeve as a two or three part component as envisaged by the disclosure in Specifications: U.K. Pat. No. 476,590 and U.S. Pat. No. 1,947,973, or expensive special purpose machinery is necessary for manufacturing the sleeve as a one piece component as envisaged by the disclosure in U.S. Pat. No. 2,328,312 and U.K. Pat. No. 1,356,172. Secondly, the provision of the axially extending blind ended recesses calls for a relatively large sleeve and a correspondingly large housing within which the sleeve and rotor are mounted. This is incompatible with the desirability of providing a small, compact, steering gear as called for in modern vehicles. It is therefore an object of the present invention to provide a rotary valve for a power assisted steering gear and also a method of manufacturing the sleeve for such a valve which will lend themselves to the economic manufacture of a compact valve assembly without loss of efficiency or reliability when compared with conventional forms of rotary valves for power assisted steering.

STATEMENT OF INVENTION AND ADVANTAGES

According to the present invention there is provided a rotary valve for control of fluid to power assistance means of a steering gear which valve comprises a sleeve having an axial bore; first port means for connection to fluid pressure supply; second port means for connection to the power assistance means; third port means for connection to exhaust/reservoir; a rotor mounted in said bore, the rotor having fluid distributing zones displacement of which during relative rotation between the rotor and sleeve determines fluid flow between the port means to control actuation of the power assistance means, and wherein at least one said port means comprises axially extending slot means formed in the bore of the sleeve, one end of said slot means terminating within the bore and the other end opening into a radially extending end face of the sleeve.

By the present invention the important feature that the axially extending slot means opens into an end face of the sleeve permits that slot means to be formed by relatively inexpensive machining or other techniques (such as spark erosion) and avoids the necessity, as in conventionally formed sleeves, of forming the blind ended internal recesses in the sleeve. Consequently the valve sleeve can be formed as a one piece component by relatively inexpensive machining operations. It is appreciated that all of the port means in the valve sleeve are unlikely to be in the form of the axially extending slot means and accordingly one or more of the port means may comprise a passage which extends radially through the sleeve wall. This passage or passages may, again, be simply formed by a boring, broaching or other conventional machining technique. Furthermore, by the present invention the feature that the axially extending slot means opens into an end face of the sleeve lends itself to a sleeve design with a relatively short axial length since fluid flow to and from the port formed by the slot means can be achieved through the side face of the sleeve; in this way, the sleeve design can avoid the additional axial length which, with conventional designs (having the axially extending recesses which are closed at both ends of the sleeve) require fluid communication to those recesses by way of passages which open into the cylindrical outer surface of the sleeve.

Where one of the port means comprises a passage which extends radially through the sleeve wall such a passage may form control edges in the bore which control edges can be axially extending and rectilinear to co-operate with the distributing zones for the control fluid flow through that port means. With this latter feature in mind the passage may be formed, for example by broaching, to be rectangular with a pair of opposed sides of the rectangle forming control edges in the bore that are substantially parallel to the axis of the sleeve. Preferably the first port means for connection to the fluid pressure supply is in the form of an aforementioned rectangularly formed port means having the control edges to ensure that fluid pressure supply is accurately and efficiently directed as appropriate during use of the valve irrespective of whether the valve is of the open centre type or closed centre type as are generally known in the art. Where a port means in the sleeve or rotor is merely for fluid access or egress and has no control edges associated therewith, such a port means may comprise a simple bore through the sleeve wall or in the rotor.

The slot means may have a substantially constant depth in the sleeve wall over the major part of its axial extent in the bore; in such a design it is likely that the end of the slot means which terminates within the bore will be radiussed to provide an exit path for a cutting tool by which that slot is likely to be formed. Alternatively, the depth of the slot means may decrease as the slot means progresses axially along the bore in the direction from the end face into which that slot means opens.

This progressive decrease in depth may provide the base of the slot with a curved profile over its axial extent but preferably the base is rectilinear to be inclined with respect to the axis of the sleeve.

Conventional rotary valves have a neutral open-centre or closed centre condition so that relative rotation between the rotor and sleeve in one or the opposite senses from this neutral condition directs fluid as necessary to drive the power assistance means in the appropriate direction to assist the steering manoeuvre. To achieve this function it is usual for the port means to be symmetrically disposed around the circumference of the valve sleeve and preferably two axially extending slot means are provided which are located in diametrically opposite sides of the bore. These two slot means may open into a common end face of the sleeve or one into each of two axially opposite end faces of the sleeve.

The aforementioned arrangement in which the depth of the slot means decreases as the slot means progresses axially along the bore in a direction from the end face into which that slot means opens lends itself to a particularly advantageous and convenient method of forming the sleeve. This method comprises providing an axially extending tubular workpiece from which the sleeve is to be formed and rectilinearly machining the slot means in an end part length of the bore of the workpiece so that said machining is inclined with respect to the axis of the workpiece and the depth of the resultant slot decreases as it progresses axially from an end face of the workpiece into the bore of the workpiece.

The rectilinear machining operation is conveniently achieved by a broaching technique in which the teeth of the broaching tool progressively increase in size to cut the slot means to the required dimensions and profile in a straight single pass of the tool over the workpiece. In the aforementioned construction where two slot means are located in diametrically opposite sides of the bore to open one into each of the opposite end faces of the sleeve, it is preferred that the two slot means are rectilinear and inclined at substantially the same angle with respect to the axis of the sleeve and are substantially parallel with each other. This latter design lends itself to a simple and convenient application of the aforementioned broaching technique for forming the sleeve whereby the two slot means are rectilinearly machined simultaneously or consecutively as a single machining operation. This proposal may again be achieved by use of a rectilinear broaching tool carrying two sets of progressively increasing sized teeth, one for each of the slot means, and which tool is passed through the bore of the sleeve to cut the respective slot means, conveniently, in a single pass.

One or more of the slot means may be formed by at least two substantially parallel and adjacent similarly formed slots. This has the advantage of providing a bearing surface zone for the rotor in the region of the bore circumferentially between the two adjacent slots.

At least one of the slot means will usually form axially extending rectilinear control edges in the bore which edges co-operate with the distributing zones of the rotor to control fluid flow through the port means which comprises that slot means. Although the slot means can be formed by broaching as discussed above, it is envisaged that alternative methods of forming will be available such as spark erosion techniques, milling, shaping and possibly honing or grinding as a finishing operation. The sleeve can also be formed by use of a casting or sintering process.

A particular advantage of the present invention is that the sleeve can be formed as a one piece component (other than, of course, for sealing and bearing means which are conventionally applied to the sleeve). It is to be realised however that the sleeve may be an integral part of a shaft or attached to a shaft which is intended to form part of a steering gear. It is also to be realised that each of the first, second and third port means may comprise one or more discrete ports in the sleeve and also that one or more of the port means may comprise one or more discrete ports in the rotor and which communicate with passage means extending through the rotor.

DRAWINGS

Embodiments of the present invention will now be described, by way of example only, with reference to the accompanying illustrative drawings in which:

FIG. 6 is an axial section through a further form of rotary valve constructed in accordance with the present invention;

FIG. 7 is a flat development of the sleeve and rotor in the valve of FIG. 6;

Figure 13:
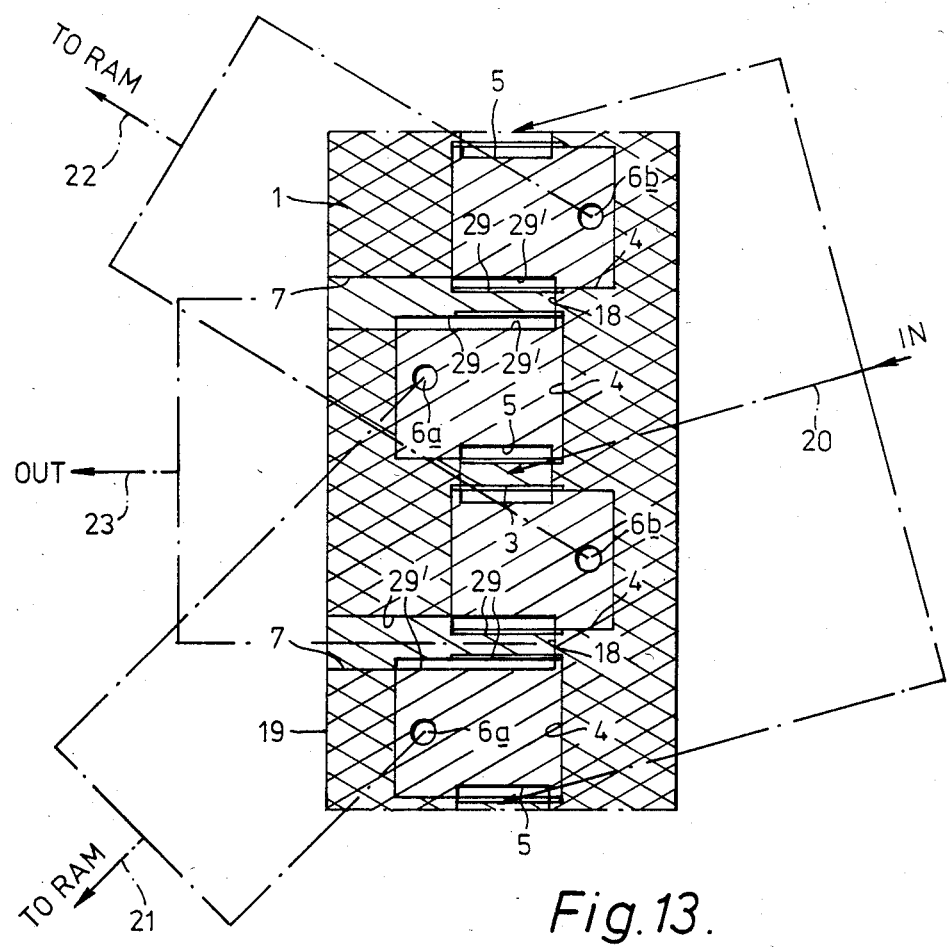
Figure 14:
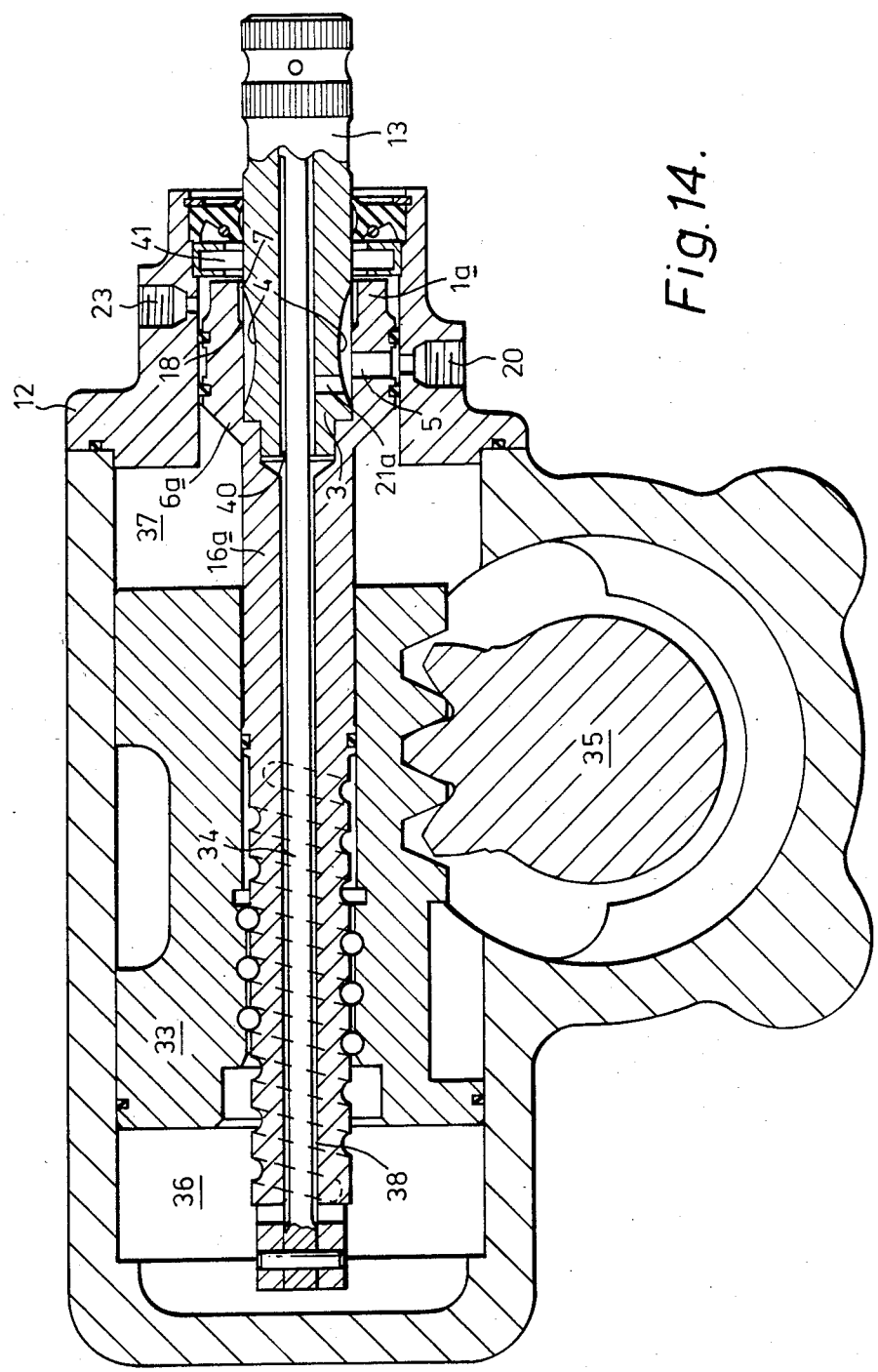

FIG. 13 is a flat development of the sleeve and rotor of a rotary valve constructed in accordance with the present invention and illustrates a modified arrangement for the distributing zones in the rotor to axially distribute bearing surface zones for the rotor in the sleeve bore; and FIG. 14 is an axial section through another typical form of vehicle steering gear which includes a rotary valve constructed in accordance with the present invention in which the valve sleeve is integral with a worm shaft of the gear.

DETAILED DESCRIPTION OF THE DRAWINGS

Figure 1:
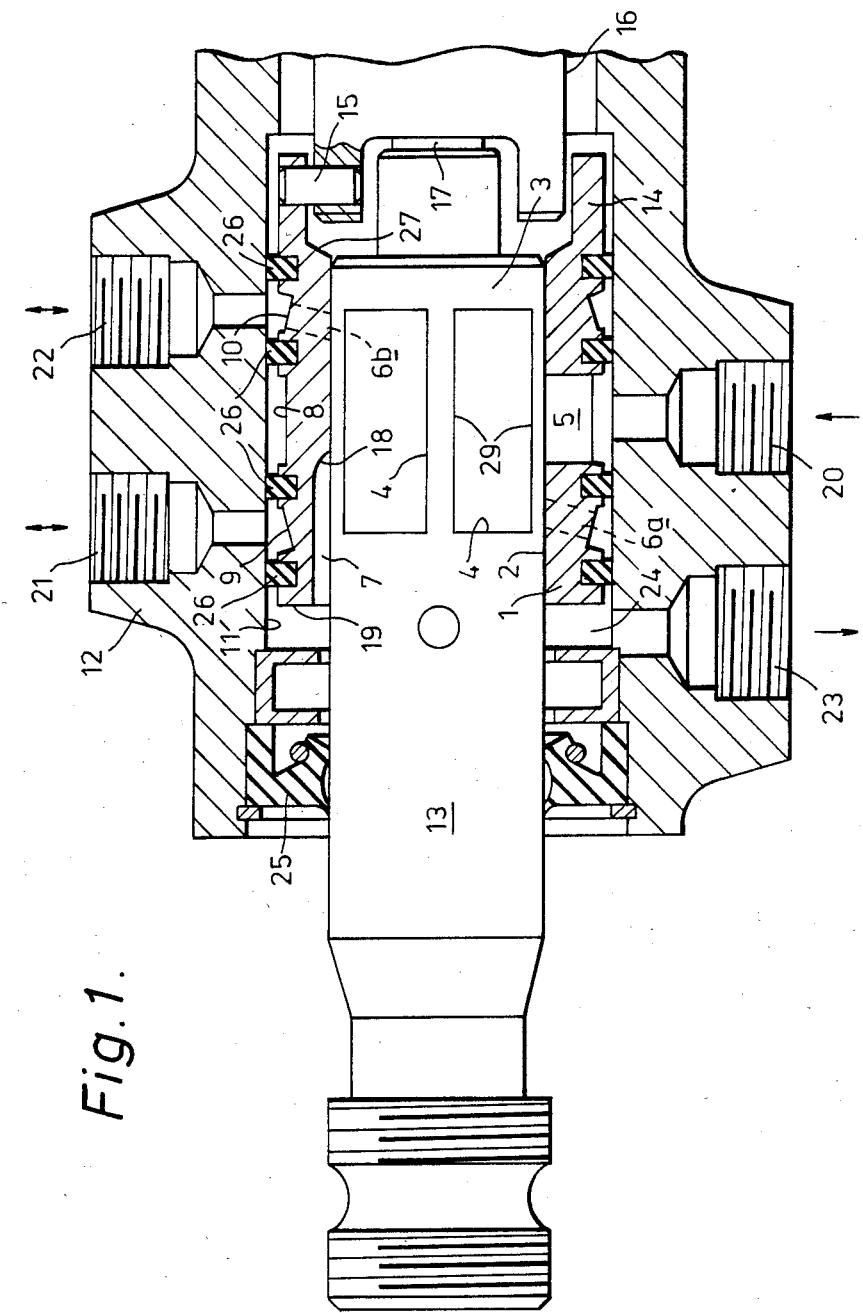
FIG. 1 is an axial section through one form of rotary valve constructed in accordance with the invention and shows a valve mounted in a housing for use in a power assisted steering gear.

The rotary valve in the arrangement of FIG. 1 has a sleeve 1 with a cylindrical bore 2. Mounted in the cylindrical bore 2 is a rotor 3 having a circumferentially spaced array of rectangular distributing zones 4. The sleeve 1 has first port means 5 for connection to a fluid pressure supply, second port means 6a, 6b for connection to power assistance means of the steering gear and third port means 7 for connection to exhaust/reservoir (sometimes referred to in the art as "low pressure return"). In the present example, the first port means 5 in each case is formed by a rectangularly sectioned passage which extends radially through the wall thickness of the sleeve 2 to open into an annular recess 8 in the exterior of the sleeve. The second port means 6a, 6b in each case, comprises a bore which extends radially through the wall of the sleeve. Conventionally the power assistance means will be in the form of a double acting piston and cylinder device which is incorporated in the steering gear so that fluid pressure is directed to one or the other side of the device whilst the opposite side is exhausted to displace the piston and cylinder as appropriate to provide assistance to the steering manoeuvre; consequently, at least two ports 6a and 6b are provided which communicate one with each of two axially spaced annular recesses 9 and 10 in the exterior surface of the valve sleeve. The valve sleeve is rotatably mounted in a cylindrical bore 11 of a housing 12 which forms part of the steering gear. The rotor 3 has a shaft 13 which extends from the housing 12 and is intended to be rotated in response to a steering input. The sleeve 1 has an integral skirt 14 by which the sleeve is connected through pins 15 for rotation with a steering shaft 16 (which may be connected to a pinion in the case of a rack and pinion steering gear or a worm in the case of a worm and nut steering gear) so that rotation of the shaft 16 provides a steering output from the gear. A resilient coupling 17 is provided between the rotor 3 and the shaft 16. The coupling 17 is conveniently in the form of a torsion rod and permits relative rotation between the rotor 3 and the shaft 16 (and thereby the sleeve 1) in response to a steering manoeuvre and this relative rotation between the distributing zones 4 and the ports in the sleeve 1 is intended to control fluid flow to and from the power assistance piston and cylinder device.

The third port means in the sleeve is in the form of one or more axially extending slots 7 which are formed in the bore of the sleeve 1 so that one end 18 of the slot is closed and terminates within the bore while the other end opens into a radially extending end face 19 of the sleeve. The housing 12 has a fluid pressure supply port 20 which is in constant communication with the annular recess 8; a port 21 which is in constant communication with annular recess 9 and a port 22 which is in constant communication with recess 10. These ports 21 and 22 communicate with opposite sides of the power assistance means in conventional manner while a port 23 in the housing 12 provides for low pressure return to reservoir.

The port 23 is in constant communication with an exhaust chamber 24 which is formed between the end face 19 of the sleeve and annular seals 25 within which the shaft 13 rotates; the axial slots 7 open into the chamber 24 to be in constant communication with exhaust. The recesses 8 to 10 and chamber 24 are sealed by annular seals 26 on the sleeve which seals rotatably mount the sleeve in the housing. The arrangement of the ports 5 to 7 and distributing zones 4 will be described in greater detail hereinafter. However, it will be apparent from FIG. 1 that the arrangement of the port means 7 as an axially extending slot which opens into the end face 19 of the sleeve (and thereby to the chamber 24 and return) alleviates the requirement for an additional annular recess to be provided on the exterior of the sleeve which would be necessary if the third port means 7 were in the form of a passage through the wall thickness of the sleeve (similar to the passages 6a, 6b) as is conventional practice—the preferred arrangement shown in FIG. 1 therefore permits the valve sleeve to have an axial length which is less than that which would normally be provided.

Figure 2:
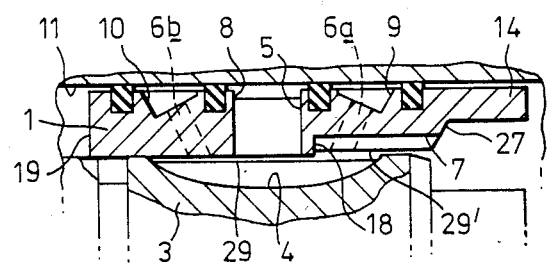
FIG. 2 is an axial section through part of a rotor and sleeve assembly similar to that incorporated in FIG. 1.
Figure 3:
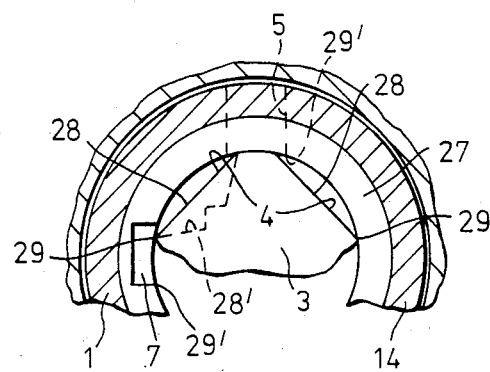
FIG. 3 is a radial section through the rotor and sleeve assembly of FIG. 2 and illustrates a possible modification for distributing zones in the rotor.

The rotary valve shown in FIG. 2 is substantially the same as that shown in FIG. 1, the major difference being that the axially extending slot means 7 are located to open into the opposite end face 27 of the sleeve. Over its region which carries the distributing zones 4 the rotor 3 may be of generally square section as shown in FIG. 3 so that four distributing zones are provided each being a substantially rectangular flat 28. Alternatively, the distributing zones can be in the form of recesses as indicated at 29 and well known in the relevant art.

Figure 4:
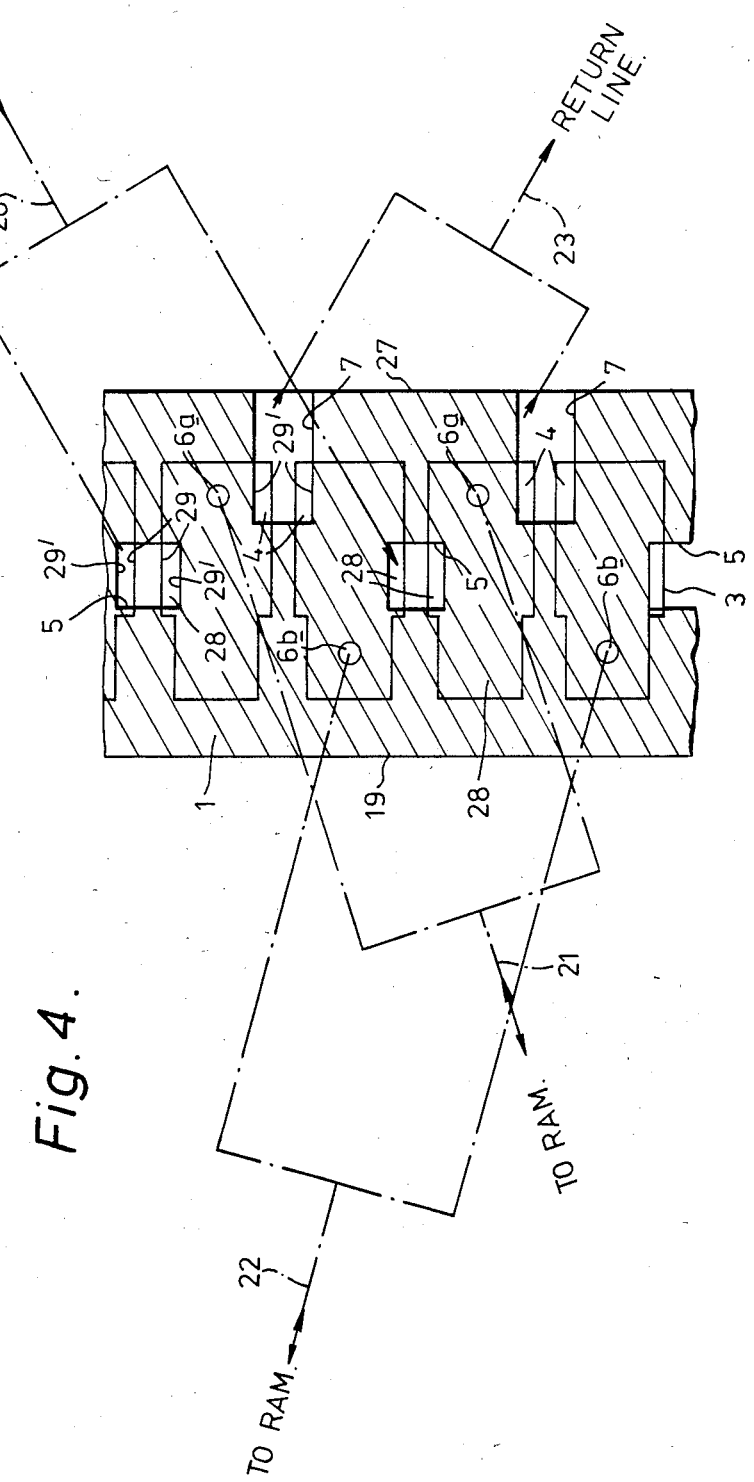
FIG. 4 is a flat development of the rotor and sleeve arrangement shown in FIG. 2.

The rotary valve in FIGS. 2 and 3 has its ports symmetrically disposed relative to the circumference of the sleeve to be of the open centre type whereby in a neutral (inoperative) condition fluid pressure supply from an hydraulic pump or otherwise passes freely through the valve to the low pressure return or reservoir. This is best illustrated in the flat development of FIG. 4 where the sleeve has two diametrically opposed rectangular ports 5 and two diametrically opposed axially extending slots 7 which open into the same end face 27 of the sleeve. Both slots 7 communicate with the return line 23 while both ports 5 communicate with the pressure line 20. In the neutral condition (as shown) each of the four distributing zones 28 circumferentially bridges a pressure port 5 and a return slotted port 7. In addition two ports 6a which communicate with the line 21 to one side of the power assistance means and two ports 6b which communicate with the line 22 to the other side of the power assistance means are in constant communication, as appropriate, one with each of the distributing zones 28 so that the valve is both open centre to the pump and open return to both sides of the power assistance means in its neutral condition. It will be apparent from FIG. 4 that during relative rotary displacement between the rotor 3 and sleeve 1 in one sense of direction fluid pressure will progressively be directed to one side of the power assistance means while the other side is exhausted and vice versa during relative rotation between the sleeve and rotor in the opposite sense of direction so that power assistance is available to assist the steering manoeuvre which causes the aforementioned relative rotation.

The ports 5, 6a and 6b, slots 7 and distributing zones 28 can be formed relatively simply and inexpensively by conventional machining techniques. In forming these parts the ports 5, slots 7 and zones 28 are preferably provided with accurately machined control edges 29, 29' which extend axially parallel to the sleeve axis and it is the movement of the control edges 29 on the rotor circumferentially relative to the control edges 29' in the sleeve which controls the fluid flow through the ports 5 and 24 (and thereby to the power assistance means). The axial extent of the control edges 29 for the distributing zones need only be as long as is necessary to provide an appropriate axial overlap with the associated control edges 29' of the ports 5 and 7 but it is likely that the control edges 29 will be longer than necessary to facilitate manufacture of the distributing zones 28.

The sleeve 1 is a one piece component which may be sintered or cast to form the port means in situ. More likely however the sleeve will be formed from a cylindrical workpiece by appropriate machining where, for example, the passages 6a and 6b may be simple bores and the ports 5 broached to their rectangular section. The slots 7 may be accurately formed by a spark erosion process where, for example, the closed end 18 may terminate abruptly—as shown in FIG. 2; alternatively the slot 7 may have its closed end 18 rounded or tapered as shown in FIG. 1 to provide a lead-out path for a shaping, milling or grinding tool by which the slot can be cut with a cyclical action.

Figure 5:
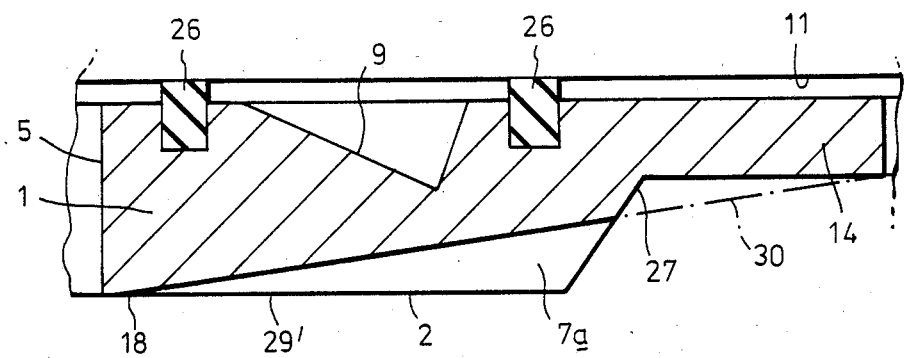
FIG. 5 is an axial section through part of the sleeve in FIG. 2 and illustrates an alternative form of slot means for that sleeve.

In each of the arrangements shown in FIGS. 1 and 2 the slot 7 has a substantially constant depth in the sleeve wall over the major part of its axial extent. However, in the modification shown in FIG. 5 the slot means indicated at 7a has a depth which decreases as the slot progresses axially along the bore 2 in a direction from the end face 27 into which the slot opens. The slot 7a is rectilinear and has a flat bottom which is inclined as indicated by the line 30 with respect to the axis of the sleeve 1 so that the slot tapers continuously from its opening in the end face 27 to where it terminates within the bore 2. This particular configuration for the slot means 7a lends itself to a most convenient manufacturing technique where the slots 7a are simply broached along the line 30 by a single pass from a rectilinear broaching tool.

The open ended slots 7 are not necessarily restricted for use as the low pressure return ports; for example designs are envisaged in which one set of open ended slots which communicate with one end face of the sleeve can provide low pressure return ports whilst a second set of open ended slots which communicate with an opposite axial end face of the sleeve can provide communication to one side of the power assistance means. Such an arrangement is possible with the rotary valve shown in FIGS. 6 and 7 where the previously proposed passages 6b are replaced by axially extending slots 7b which are formed similarly to the slots 7 but extend to open into the opposite end face 19 of the sleeve. These slots 7b will communicate with a chamber which will be in constant communication with the line 22 to one side of the power assistance means.

FIG. 6 includes a possible modification whereby an auxilliary passage 31 communicates from each slot 7 radially through the wall of the sleeve 1 to an annular recess in the exterior of the valve sleeve which is intended for communication with the low pressure return line 23. Such passages 31 (which are also indicated in FIG. 7) can be provided where the end of the slot 7 in the face 27 is closed, for example by a bearing 32 for the rotor (which bearing obturates fluid flow from the slot 7 by means of the route envisaged in the FIG. 4 arrangement).

Figure 8:
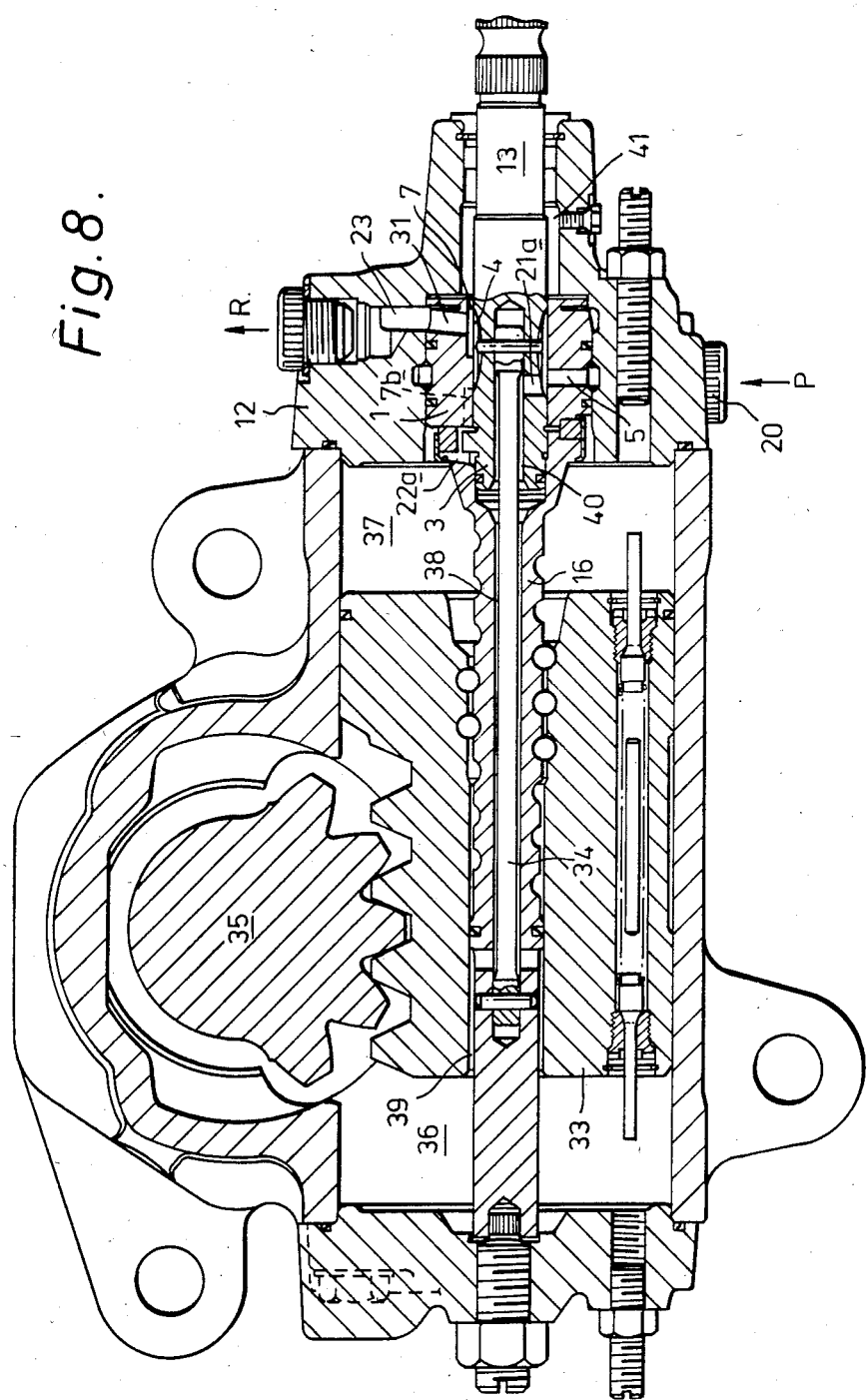
FIG. 8 is an axial section through a typical power assisted steering gear which incorporates a rotary valve similar to that shown in FIG. 6.

The steering gear illustrated in FIG. 8 embodies a rotary valve construction similar to that discussed with reference to FIGS. 6 and 7 where two sets of open ended slots 7 and 7b are provided which open one into each of the opposite end faces of the sleeve and the slots 7 in one set communicate with an auxilliary passage 31 through the wall of the sleeve 1 to permit free flow of fluid from that slot. The steering gear of FIG. 8 is, generally, a conventional form of a worm and nut gear in which a worm shaft 16 drives a piston/nut 33 in response to rotation of the worm by rotation of an input shaft 13—the shafts 13 and 16 being coupled together by an axially extending torsion rod 34. The nut 33 is toothed and engages a toothed sector 35, rotation of which in response to axial displacement of the nut 33 provides a steering output. The nut 33 constitutes a piston with opposed pressure chambers 36, 37 for use as a power assistance double acting piston and cylinder device, the hydraulic fluid supply for which is controlled by the rotary valve actuated in response to relative rotation between the sleeve 1 and the rotor 3 which is incorporated at the end of the shaft 18 in a conventional manner. The sleeve 1 is coupled for rotation with the worm shaft 16 and passages 22a are provided within this coupling to communicate between the open ends of the set of slots 7b and the piston chamber 37. Fluid flow to and from the chamber 37 is therefore effected by way of the passages 22a and slots 7b. Fluid flow to and from the opposing piston chamber 36 is achieved by way of axially extending passageways 38, 39 and 40 in the worm shaft 16, piston/nut 33 and rotor 13 respectively and a radially extending passage 21a in the rotor 3. The passage 21a communicates with the passage 40 and fluid flow to and from this passage is determined by the control ports in the rotary valve.

The open ends of the slots in the set 7 communicate, without effect, with an annular chamber 41 formed between the shaft 13 and the housing 12; this chamber 41 is in constant communication (through the slots 7 and auxilliary passage 31) with the return passage 23.

It will be seen from FIG. 8 that by provision of the axially extending sets of slots 7a and 7b it is only necessary to provide two axially spaced annular recesses in the external surface of the sleeve 1, one of these recesses providing constant communication with the fluid pressure feed line 20 and the other providing constant communication with the return line 23; as a consequence the sleeve 1 can have a relatively small axial extent which can be reflected in a reduced size for the rotary valve and its housing in the steering gear.

Figure 9:
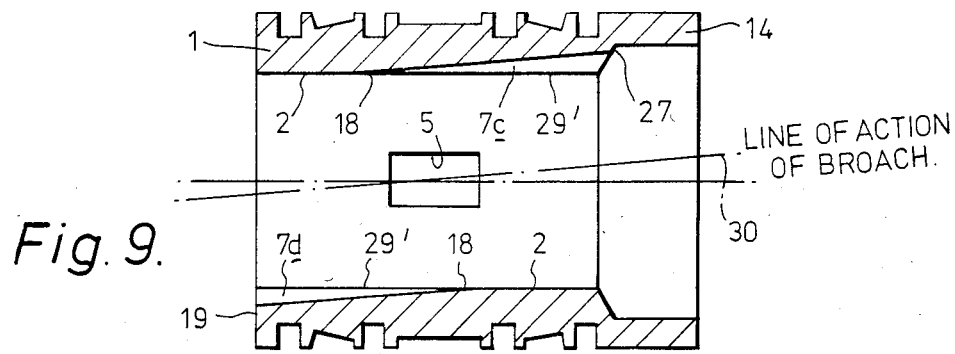
FIG. 9 is an axial section through a modified form of sleeve for use in a rotary valve constructed in accordance with the present invention in which diametrically opposed slot means are suitable for rectilinear cutting in a single machining operation.
Figure 10:
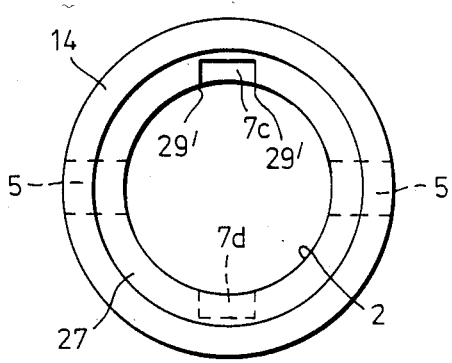
FIG. 10 is an end view of the sleeve shown in FIG. 9.

Generally the ports in a rotary valve of a power steering gear of the type with which the present invention is concerned are symmetrically disposed circumferentially with respect to the sleeve so that fluid control is effected similarly during relative rotation between the rotor and sleeve in one or the opposite senses from a neutral condition of the valve. With this in mind the valve sleeve will usually have two axially extending slots 7c and 7d (see FIGS. 9 and 10) which slots are located in diametrically opposite sides of the sleeve bore 2 to lie in a common plane which includes the axis of the sleeve. These two slots may open one into each of two axially opposite end faces 19 and 27 of the sleeve and be substantially rectilinear to have flat bottoms which are inclined as shown in FIG. 9 so that the depth of each slot 7c and 7d decreases as the slot progresses axially along the bore 2 from the end face 19 or 27 into which that slot opens. Each of the slots 7c and 7d can be formed by a rectilinear broaching technique along the broach line 30 in a similar manner to that previously discussed with reference to FIG. 5. However, the particular arrangement shown in FIG. 9 with the slots 7c and 7d inclined at substantially the same angle with respect to the axis of the sleeve and in parallel alignment with each other lends itself to rectilinearly broaching the slots 7c or 7d simultaneously or consecutively as a single machining operation (thereby reducing manufacturing time and cost).

Figure 11:
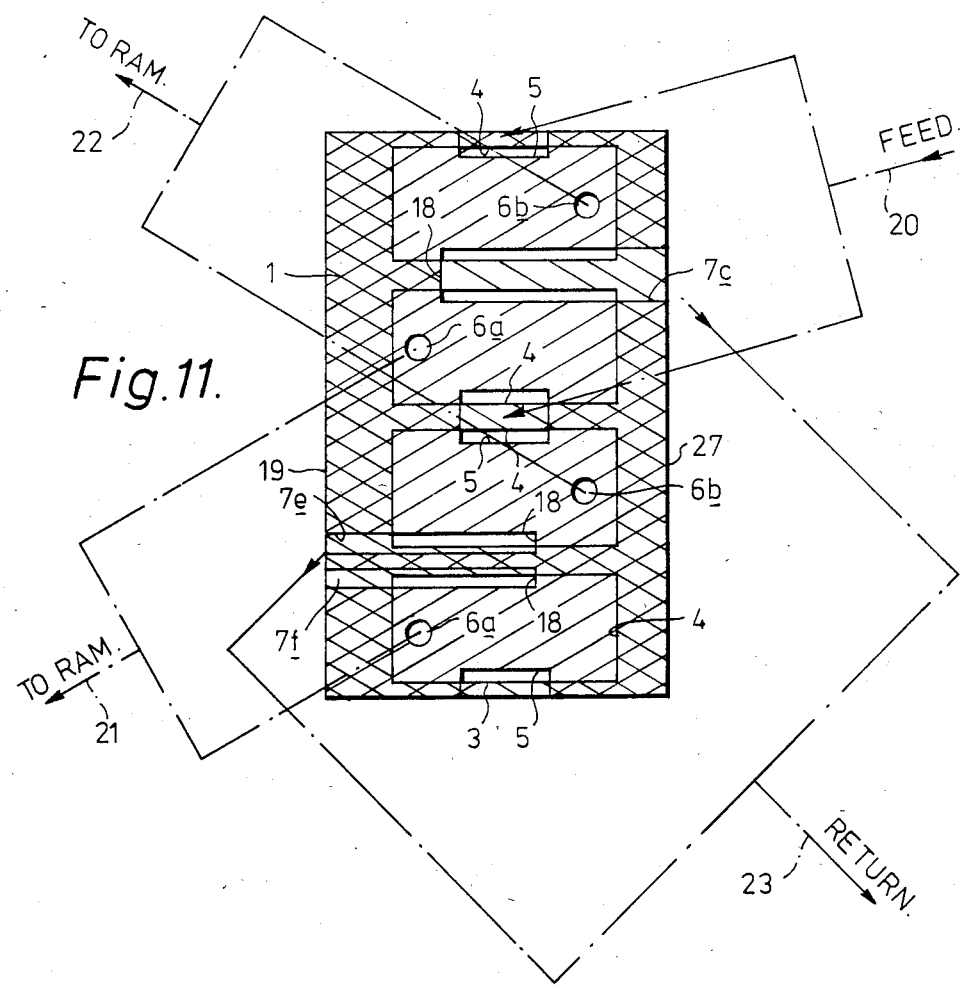
FIG. 11 is a flat development of the sleeve shown in FIG. 9 and illustrates the relative positioning between port means in the sleeve and distributing zones of a rotor which would be accommodated within the sleeve; the slot means in FIG. 11 including a possible modification to comprise two discrete and parallel slots.
Figure 12:
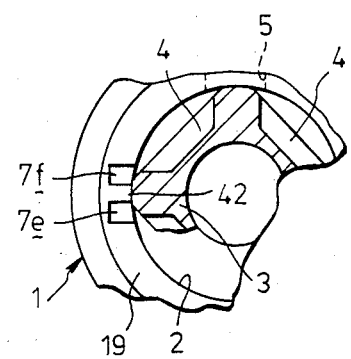
FIG. 12 is a radial section of a sleeve shown in FIG. 11 and a rotor within that sleeve and particularly illustrates the modified slot arrangement.

The flat development of the sleeve shown in FIG. 11 includes a possible modification in the structure of the axially extending open ended slots 7 whereby each such slot as incorporated in the previously described arrangements can be effectively replaced by two similarly formed slots which are located adjacent and parallel to each other; these two adjacent slots shown at 7e and 7f in FIGS. 11 and 12 provide control ports which co-operate with the rotor 13 in a similar manner to that previously described but have the additional advantage in that they form a bearing surface zone 42 for the rotor 13 in the region of the bore 2 circumferentially between the two adjacent slots 7e and 7f. It will, of course, be appreciated that the slots 7e and 7f can be formed similarly to the previously described slots 7, 7a, 7c or 7d.

In the modification shown in FIG. 13 each of the flats or recesses which form the distributing zones 4 of the rotor is displaced axially with respect to the two distributing zones 4 to which it is adjacent and peripherally between which it is positioned. By such a staggered layout for the distributing zones 4, opposed part-cylindrical bearing surface zones which are provided between the rotor and the bore 2 of the sleeve are staggered axially around the bore; it is believed that such an axial distribution can be used to alleviate distortion in the sleeve and improve the bearing which the sleeve bore provides for the rotor.

In each of the above described arrangements the sleeve is formed as a discrete component in the rotary valve; this arrangement is by no means essential and as shown in FIG. 14 the sleeve 1a is formed integral with and at the end of a worm shaft 16a of a worm and nut power steering gear that is similar in many respects to that previously described with reference to FIG. 8.

In the FIG. 14 arrangement only one set of axially extending slots 7 are provided which open into the free end face of the valve sleeve 1a while the slots 7b in the FIG. 8 arrangement have effectively been replaced by a bore 6a which communicates through the wall of the sleeve between the piston chamber 37 and the distributing zones 4 in the rotor 3.

I claim:

1. A rotary valve for control of fluid to power assistance means of a steering gear which valve comprises a one piece sleeve having a cylindrical axial bore; first port means for connection to fluid pressure supply; second port means for connection to the power assistance means; third port means for connection to exhaust/reservoir; a rotor mounted in said bore, the rotor having fluid distributing zones displacement of which during relative rotation between the rotor and sleeve determines fluid flow between the port means to control actuation of the power assistance means, and wherein at least one said port means comprises axially extending slot means formed in the cylindrical bore of the sleeve, one end of said slot means terminating within the bore and the other end opening into a radially extending end face of the sleeve.

2. A valve as claimed in claim 1 in which at least one of said port means comprises a passage which extends radially through the sleeve wall.

3. A valve as claimed in claim 2 in which at least one said port means which comprises a passage extending radially through the sleeve wall forms axially extending rectilinear control edges in the bore which control edges co-operate with the distributing zones to control fluid flow through that port means.

4. A valve as claimed in claim 3 in which that control port which comprises the passage extending radially through the sleeve wall is rectangular with opposed sides of the rectangle forming control edges in the bore which are substantially parallel to the axis of the sleeve.

5. A valve as claimed in claim 1 in which the slot means has a substantially constant depth in the sleeve wall over the major part of its axial extent in the bore.

6. A valve as claimed in claim 1 in which the depth of the slot means decreases as the slot means progresses axially along the bore in a direction from the end face into which that slot means opens.

7. A valve as claimed in claim 1 in which two said axially extending slot means are provided, said slot means being located in diametrically opposite sides of the bore.

8. A valve as claimed in claim 7 in which the two slot means open at a common end of the sleeve.

9. A valve as claimed in claim 7 in which the two slot means open one into each of two axially opposite end faces of the sleeve.

10. A valve as claimed in claim 9 in which each of the two slot means decreases in depth as that slot means progresses axially along the bore in a direction from the end face into which that slot means opens, and wherein the two slot means are rectilinear and are inclined at substantially the same angle with respect to the axis of the sleeve and are substantially parallel with each other.

11. A valve as claimed in claim 1 in which at least one said slot means comprises at least two substantially parallel and adjacent similarly formed slots.

12. A valve as claimed in claim 11 in which a bearing surface zone is provided for the rotor in the bore circumferentially between the two adjacent slots.

13. A valve as claimed in claim 1 in which at least one of said slot means forms axially extending rectilinear control edges in the bore which edges co-operate with the distributing zones to control fluid flow through the port means which comprises that slot means.

14. A valve as claimed in claim 1 in which at least one said slot means communicates with an auxilliary passage which extends radially through the sleeve wall.

15. A valve as claimed in claim 1 in which the circumferential extent of each of the distributing zones is defined by axially extending rectilinear control edges which edges, during rotation of the rotor co-operate with the port means to control fluid flow.

16. A valve as claimed in claim 1 in which the distributing zones comprise an array of flats or recesses peripherally spaced about the rotor.

17. A valve as claimed in claim 16 in which each of the flats or recesses of the distributing zones is displaced axially with respect to the two flats or recesses to which it is adjacent and peripherally between which it is positioned so that part-cylindrical bearing surface zones provided between the rotor and bore are staggered axially around the bore.

18. A valve as claimed in claim 1 in which the third port means comprises at least one said slot means.

19. A valve as claimed in claim 1 in which the second port means comprises at least one said slot means.

20. A valve as claimed in claim 2 in which the first port means comprises at least one passage which extends radially through the sleeve wall.

21. A valve as claimed in claim 2 in which the second port means comprises at least one passage which extends radially through the sleeve wall.

22. A valve as claimed in claim 2 in which at least one port means which comprises a passage extending radially through the sleeve wall communicates through that passage with an annular recess in the outer surface of the sleeve and by which annular recess fluid communication is to be maintained with that passage 23. A valve as claimed in claim 22 in which the sleeve has three said annular recesses, one annular recess for fluid pressure supply to the first port means and the other two for connection to the power assistance means.

24. A valve as claimed in claim 23 and comprising a housing within which the sleeve is rotatably mounted, and wherein the third port means comprises said slot means and the end face into which the slot means opens forms part of a chamber in the housing which chamber is intended to be connected to exhaust/reservoir.

25. A valve as claimed in claim 1 in which at least one port means comprises a passage in the rotor.

26. A method of forming a sleeve for a rotary valve which comprises providing an axially extending tubular workpiece from which the sleeve is to be formed and rectilinearly machining a slot means in an end part length of a bore of the workpiece so that said machining is inclined with respect to the axis of the workpiece and the depth of the resultant slot decreases as it progresses axially from an end face of the workpiece into the bore of the workpiece.

27. The method as claimed in claim 26 which comprises forming the slot means by broaching.

28. A method of forming a sleeve for a rotary valve which comprises providing an axially extending tubular workpiece from which the sleeve is to be formed and rectilinearly machining a two slot means simultaneously or consecutively as a single machining operation in opposite end part lengths of a bore of the workpiece so that said machining is inclined with respect to the axis of the workpiece and the depths of the resultant slot means decrease as they respectively progress axially from a respective end face of the workpiece into the bore of the workpiece.

29. The method as claimed in claim 28 which comprises forming the two slot means by broaching.

30. A valve assembly for controlling the operation of a power steering motor, said valve assembly comprising a housing which at least partially defines a valve chamber, said housing including inlet passage means for conducting a flow of fluid from a source of fluid under pressure to said valve chamber, first and second motor passage means for conducting fluid flow for the power steering motor from said valve chamber and for conducting fluid flow from the power steering motor to said valve chamber, and drain passage means for conducting from said valve chamber a flow of fluid received from the power steering motor, a hollow one-piece valve sleeve disposed in said valve chamber in said housing, said one-piece valve sleeve including an outer side surface and a cylindrical inner side surface which at least partially defines a bore extending at least part way through said valve sleeve, said valve sleeve having an end face which cooperates with said housing to at least partially define a fluid chamber disposed at one end of said valve chamber and connected in fluid communication with a first one of the passage means in said housing, first passage means extending from a first opening in the outer side surface of said valve sleeve to a first opening in the cylindrical inner side surface of said valve sleeve to enable fluid to be conducted between a second one of the pasage means in said housing and the bore in said valve sleeve, second passage means extending from a second opening in the outer side surface of said valve sleeve to a second opening in the cylindrical inner side surface of said valve sleeve to enable fluid to be conducted between a third one of said passage means in said housing and the bore in said valve sleeve, and elongated slot means formed in said valve sleeve at a location spaced apart from said first and second passage means for conducting fluid between the fluid chamber at one end of the valve chamber and the interior of the bore in said valve sleeve, said elongated slot means having an end opening formed in the end face of said valve sleeve and a side opening formed in the cylindrical inner side surface of said valve sleeve, said end opening having a cross sectional area which is at least as great as the transverse cross sectional area of said slot means at any point along the longitudinal axis of said slot means, said side opening intersecting said end opening at the end face of said valve sleeve and being spaced apart from the first and second openings in the cylindrical inner side surface of said valve sleeve, and a rotor extending into the bore in said valve sleeve, said rotor having fluid distributing surface means for cooperating with the openings in the cylindrical inner side surface of said valve sleeve to vary the flow of fluid through at least some of the passage means in said housing upon relative rotation between said rotor and valve sleeve.

31. A valve assembly as set forth in claim 30 wherein said elongated slot means includes continuous bottom surface which extends between axially opposite end portions of said elongated slot means and which is free of openings.

32. A valve assembly as set forth in claim 30 wherein said slot means includes a flat bottom surface which extends parallel to the central axis of the cylindrical inner side surface of said valve sleeve and faces toward the side opening of said slot means and a pair of flat side surfaces which extend perpendicular to said bottom surface and intersect the cylindrical inner side surface of said valve sleeve at locations spaced from the first and second openings in the cylindrical inner side surface of said valve sleeve.

33. A valve assembly as set forth in claim 30 wherein said slot means includes a bottom surface which is skewed at an acute angle to the central axis of the cylindrical inner side surface of said valve sleeve and faces toward the side opening of said slot means, said bottom surface extends from the opening in the end face of said valve sleeve to a line of intersection with the cylindrical inner side surface of said valve sleeve.

* * * * *